United States Patent [19]

Atkinson

[11] Patent Number: 5,105,911
[45] Date of Patent: Apr. 21, 1992

[54] GAS METER COUNTER UNIT LUBRICATION SYSTEM
[75] Inventor: Albert B. Atkinson, Houston, Tex.
[73] Assignee: Dresser Industries, Inc., Dallas, Tex.
[21] Appl. No.: 679,390
[22] Filed: Apr. 2, 1991
[51] Int. Cl.5 ............................................. F01M 11/02
[52] U.S. Cl. ................................. 184/6.12; 184/11.2; 384/473
[58] Field of Search ............... 184/6.12, 11.1, 11.2, 184/11.3, 11.4, 13.1, 64, 102; 74/467; 384/462, 473, 474

[56] References Cited

U.S. PATENT DOCUMENTS

| | | | |
|---|---|---|---|
| 569,847 | 10/1896 | Tucker . | |
| 602,701 | 4/1898 | Gustaveson | 384/473 |
| 1,566,924 | 12/1925 | Robertson | 384/473 |
| 1,665,964 | 4/1928 | Koehler . | |
| 1,737,344 | 11/1929 | Sharp | 184/64 |
| 2,190,254 | 2/1940 | Caproni | 184/6.12 |
| 2,583,317 | 1/1952 | Belich | 184/13.1 |
| 2,708,985 | 5/1955 | Evans et al. | 184/11.1 |
| 3,269,646 | 8/1966 | August | 418/47 |
| 3,367,445 | 2/1968 | Dryden | 184/64 |
| 3,420,335 | 1/1969 | Dochterman | 184/6.4 |
| 3,719,254 | 3/1973 | Snider | 184/64 |
| 4,103,759 | 8/1978 | Erich et al. | 184/64 |
| 4,285,632 | 8/1981 | DeSalve | 415/175 |
| 4,391,351 | 7/1983 | Jirousek et al. | 74/467 |
| 4,739,678 | 4/1988 | Miura et al. | 74/467 |

FOREIGN PATENT DOCUMENTS 2033271  1/1972  Fed. Rep. of Germany ..... 184/6.12

Primary Examiner—Ira S. Lazarus
Assistant Examiner—Alan B. Cariaso

[57] ABSTRACT

A gear train in a counter unit of a rotary positive displacement gas meter includes loosely fitting tubular sleeves telescoped around rotatable shafts in the train. The sleeves are located between gears that are partially immersed in a lubricant reservoir contained within the counter unit and adjacent bearings and gears that are out of direct contact with the lubricant in the reservoir. During operation of the meter, oil from the reservoir flows through passages formed between the inside of each sleeve and the outside of the shaft upon which the sleeve is mounted so that the gears and the bearings in the counter unit are lubricated.

6 Claims, 3 Drawing Sheets

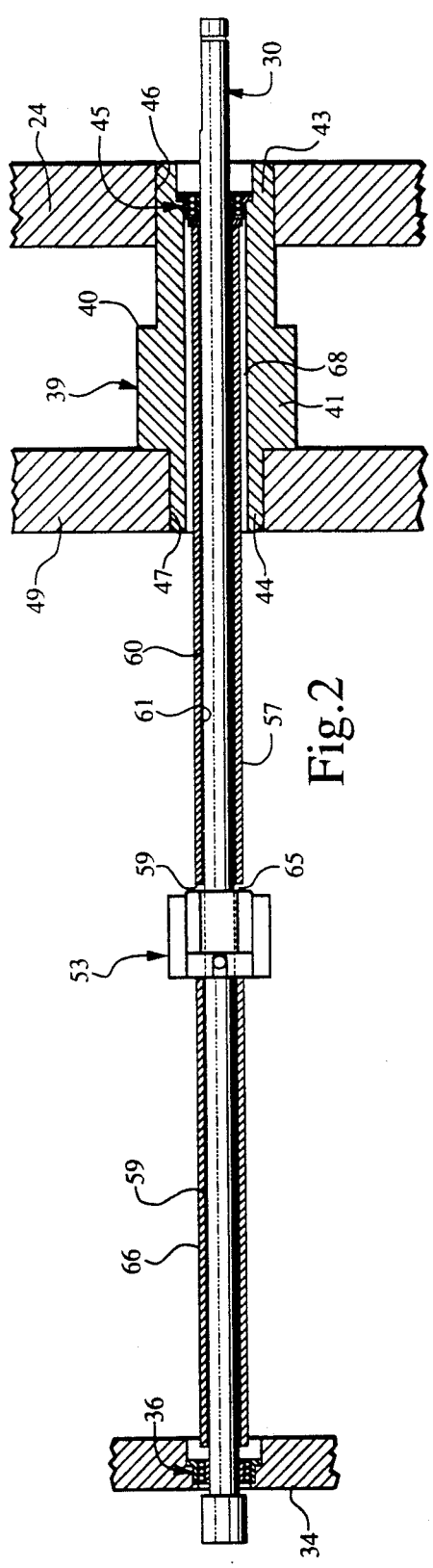
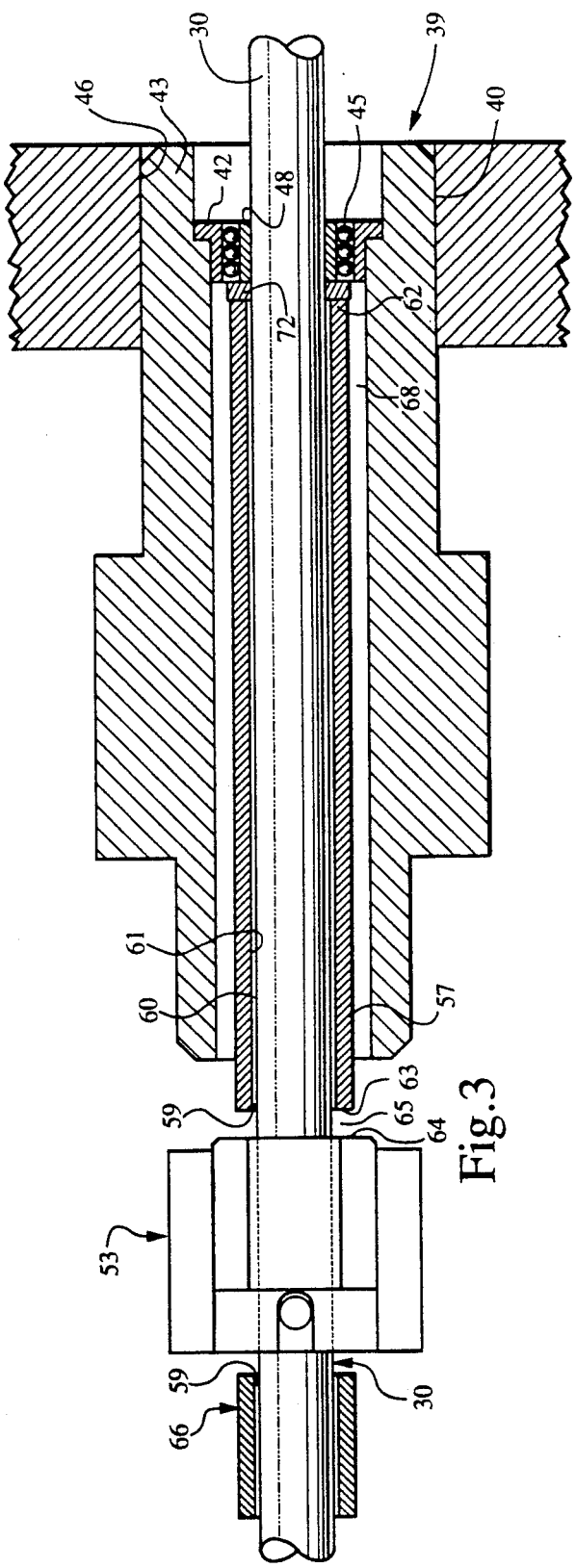
Fig. 2
Fig. 3

GAS METER COUNTER UNIT LUBRICATION SYSTEM

BACKGROUND OF THE INVENTION

1. Technical Field

This invention relates to a lubrication system used in a rotary positive displacement gas meter for lubrication of gears and, in particular, the bearings of a gear train incorporated in a gas volume counter unit of the meter.

2. Background Information

Important to the length of the service life of a gas meter is adequate lubrication of the gear train and bearing assemblies utilized in the counter unit of the meter. In prior positive displacement gas meters, different mechanisms have been used to provide lubrication to the gears and bearing assemblies of the counter units.

One form of prior lubrication system for lower speed rotating gears relies upon the transfer of lubricating oil between the meshing teeth of mating gears in the train as the delivery mechanism for the oil. Oil from one of the gears which is partially emersed in the oil in the reservoir is carried out of the reservoir on the surfaces of the gear and between its teeth and is transferred to the meshing gear as the gears in the train are rotated. The bearing units which are closely adjacent a well lubricated gear may be lubricated by the oil which collects on the shaft adjacent the gear and migrates along the surface of the shaft to the bearing units.

Another prior mechanism for the lubrication of bearings and gears which are not in direct contact with each other has been to use a higher speed rotating gear or other part as a slinger for splashing oil around within the housing of the counter unit. With the slinger being rotated at high speed through the reservoir, oil is splashed on to the wear surfaces in the gear train which require lubrication. Thus, the surfaces of the gears and bearings which are in the path of the splashed oil may be lubricated.

SUMMARY OF THE INVENTION

The present invention contemplates an improved system for lubricating the gears and bearing assemblies of the counter unit under conditions where the gears or bearing assemblies are shielded against splash lubrication or are too remote from the oil reservoir to be adequately lubricated by oil that is transferred from gear to gear in the gear train. Specifically, the present invention aims to accomplish the foregoing by utilizing novel capillary passages which are carried on various rotatable shafts in the gear train, each passage extending between the one of the gears in the train and the closest bearing unit or other wear surface to deliver some of the oil which naturally collects along the sides of the gear to the bearing unit for lubrication of the unit. Uniquely, each of the passages is created between the outside of the rotatable shaft upon which it is carried and the inside surface of a novel tubular sleeve which is loosely fitted on the shaft between the gear and the bearing unit. As a result, as the shaft rotates and stops during normal operation of the counter, oil is transferred from adjacent the gear to the bearing unit.

Invention also resides in the provision of a loosely fitting sleeve on a rotatable shaft in a rotary positive displacement gas meter for transferring lubrication oil from one location on the shaft at one end of the sleeve to another location on the shaft at the other end of the sleeve. Advantageously, oil which collects within the sleeve serves as a secondary storage reservoir providing an immediate supply of oil as rotation of the shaft starts and stops during normal intermittent operation of the meter.

The foregoing and other advantages of the present invention will become more apparent from the following description of the preferred embodiment when taken in conjunction with the accompanying drawings.

BRIEF DESCRIPTION OF THE DRAWING

FIG. 2 is an enlarged fragmentary view of a rotatable shaft of the gear train detailing the lubrication transfer mechanism of the present invention for delivering lubricant to the bearing units at opposite end portions of the shaft.

FIG. 3 is a still further enlarged fragmentary view of a portion of the rotatable shaft and gear shown in FIG. 2.

BEST MODE FOR CARRYING OUT THE INVENTION

Figure 1:
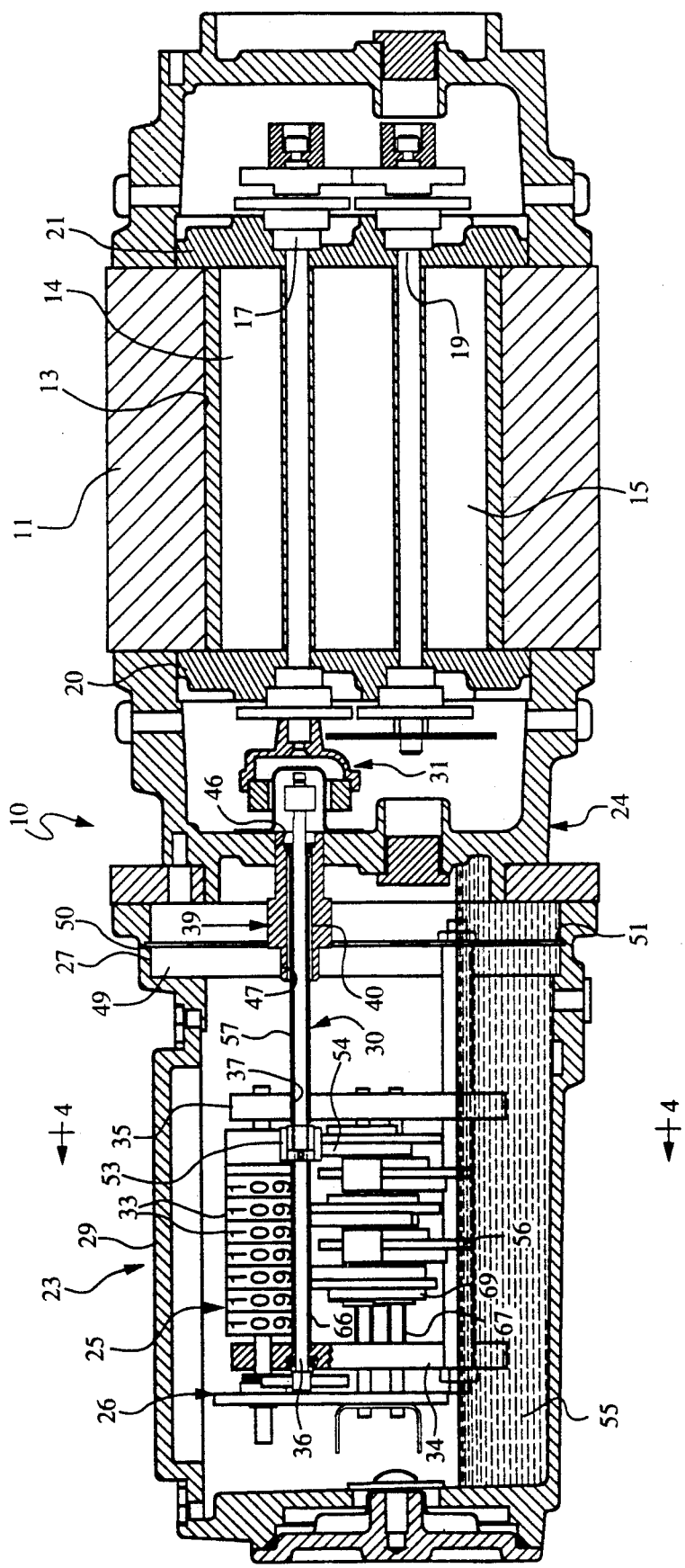
FIG. 1 is a cross-sectional view of a rotary positive displacement gas meter including a gear train of a counter unit utilizing a lubrication system of the present invention.

As shown in the drawings for purposes of illustration, the present invention is embodied in a rotary positive displacement gas meter 10. Specifically, the meter comprises a housing 11 defining a chamber 13 within which are mounted two multi-lobe rotors 14 and 15. The rotors are fixed on parallel shafts 17 and 19 which in turn are rotatably supported in chamber end plates 20 and 21 attached to opposite end portions of the housing. Inlet and outlet openings (not shown) permit the flow of gas through the chamber. As the gas flows, the rotors are turned in opposite directions with the speed of rotation of mating lobes of the rotors measuring the volume of gas flowing through the meter.

To count the number of rotations of the rotors and thereby provide a measurement of the amount of gas flowing through the meter, a read-out or counter 23 unit is attached to an end cover 24 of the meter housing 11. The counter includes an indicator mechanism 25 driven by a gear train 26 connected to the rotor 14. In the present arrangement, the indicator mechanism 25 is mounted within a counter housing 27 and my be viewed from above through a horizontal window 29 located in the top of the housing 27. Driving the indicator mechanism through the gear train 26 is the rotation of a high speed input shaft 30. The latter is connected to the shaft 17 of rotor 14 by way of a magnetic coupling 31. Thus, as the rotor is turned by gas flowing through the chamber 13, the input shaft 30 of the gear train is rotated through the magnetic coupling 31 thereby moving dials 33 on the indicator to provide a measure of the volume of gas flowing through the meter.

More particularly with respect to the gear train 26 and indicator mechanism 25, the multiple gears and shafts of the gear train are mounted between a rearward end plate 34 and an intermediate plate 35. At the rearward end of the input shaft 30 a rear bearing unit 36 is mounted within the rearward end plate 34 for rotatably supporting the input shaft 30. From its rearward end, the input shaft extends through an opening 37 in the intermediate plate 35 and to a front bearing unit 39.

As shown in FIG. 2, the front bearing unit 39 includes a tubular bearing support 40 having an enlarged diameter mid-section 41 and smaller diameter forward and rearward end sections 43 and 44, respectively. Within the forward section are roller bearing members 45 upon which the input shaft 30 rotates. For supporting and locating the input shaft within the counter housing 27, the forward end section 43 of the bearing support 40 is telescoped with a close clearance fit into a hole 46 in the meter end cover 24. Additionally, the rearward end section 44 of the bearing support 40 is secured with a press fit in an aperture 47 in an end cover plate 49 of the counter housing 27. The end cover plate is fastened to the counter housing (see FIG. 1) by a retaining ring 50 seated with a snap fit in an annular groove 51 formed in the inside wall of the housing 27.

Figure 4:
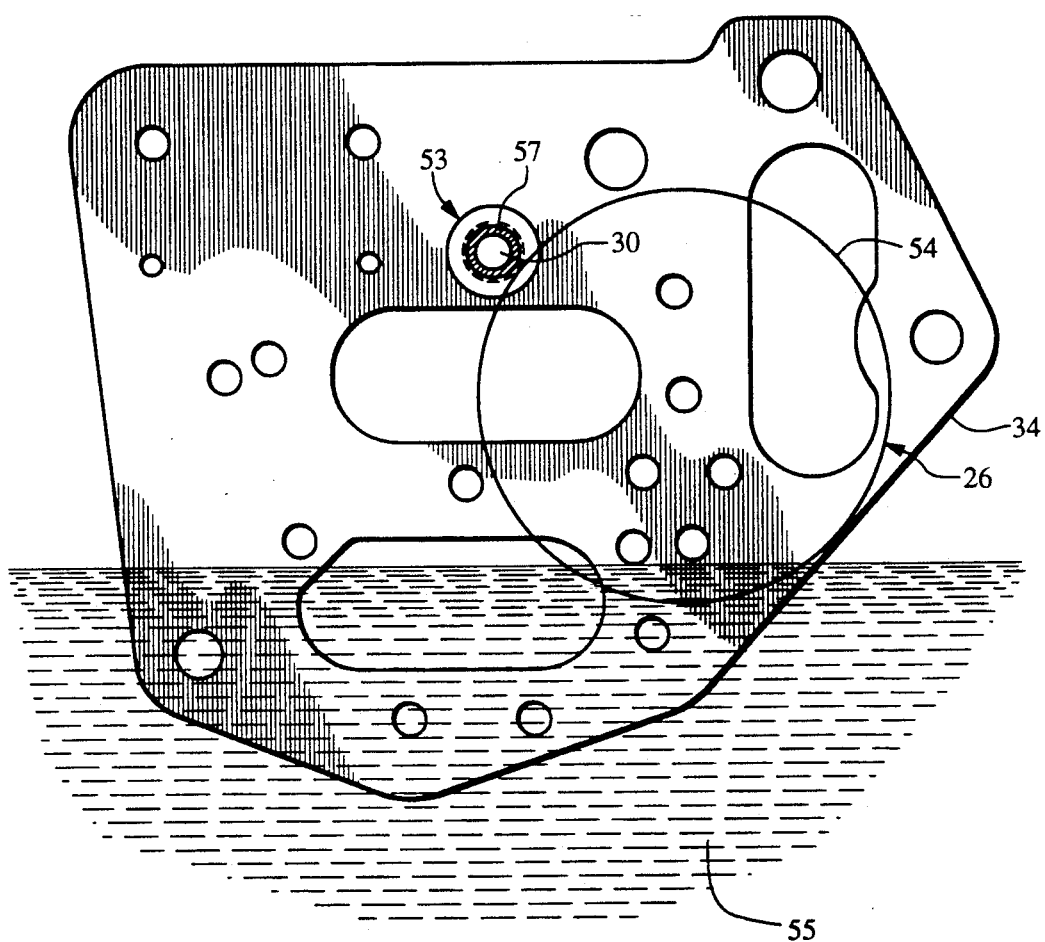
FIG. 4 is an enlarged fragmentary view taken substantially along line 4—4 of FIG. 1.

For driving the gear train, a first reduction gear 53 is fixedly mounted on the input shaft 30 between the rear and intermediate end plates 34 and 35. Herein, the reduction gear is located adjacent the intermediate plate 35 and meshes with a first transfer gear 54 in the drive train. For lubrication purposes, the first transfer gear is partially emersed within a lubricant reservoir 55 contained in the bottom of the counter housing 27 (see FIGS. 1 and 4). Similarly, other selected gears 56 of the gear train are partially emersed in the lubricant reservoir. Accordingly, as gas flows through the meter and the gears are rotated the emersed gears transfer oil from the reservoir to other meshing gears in the gear train.

In accordance with the primary aim of the present invention, lubricant also is delivered through novel lubrication passages along the surfaces of various ones of the shafts of the gear train in order to assure adequate lubrication of remote wear areas which are not in direct contact with the emersed gears. In an exemplary form, a passage 59 (see FIGS. 2 and 3) for providing lubricant to the front bearing unit 39 is formed loosely upon and carried by the high speed input shaft 30. Specifically, the passage is formed between a tubular sleeve 57 which is telescoped loosely onto the shaft between the front bearing unit 39 and the first reduction gear 53. By virtue of this arrangement, oil which collects on the shaft adjacent the first reduction gear may be transported along the shaft over a greater distance than would be possible with normal migration of the oil along the shaft. Moreover, rapid flooding of the bearing with oil occurs upon start up thereby avoiding initial wear problems.

In the present instance, the sleeve dimensions of diameter and length with respect to the shaft 30 are such as to provide capillary size clearances forming the passage 59. As shown in FIGS. 2 and 3, the passage is formed between the outside surface 60 of the shaft and the inside surface 61 of the sleeve 57 and extends in an axial direction between the gear 53 and the front bearing unit 39. Preferably, a rearward end 63 of the sleeve is spaced axially from a side 64 of the gear 53 a slight distance to form a capillary reservoir area 65 between the gear and the end 63 of the sleeve. Within this capillary reservoir 65 lubricant from the main reservoir 55 collects and serves as the supply from which lubricant to the front bearing unit 39 is obtained. Lubricant collects in the capillary reservoir as a result of the migration of oil along the side 64 of the gear from the oil which is transferred from the transfer gear 54 during the normal intermittent operation of the meter 10.

For the delivery of oil to the bearing unit 39, a forward end portion 62 of the sleeve 57 telescopes into an elongated annular recess 68 formed within the bearing support 40. As shown in FIG. 3, the end of the sleeve terminates adjacent the bearing rollers 45 with a washer 72 being located between the end of the sleeve and the rollers. The washer, like the sleeve 57, loosely fits on the shaft 30 within the recess 68. Specifically, the outer diameter of the washer is sized to fit between the inner diameter of an outer race 42 and the outer diameter of an inner race 48 for the rollers 45.

In normal service operations of the meter 10 after oil has been distributed throughout the gear train 26 after the initial start up of the meter, it will be appreciated that in addition to lubricant collecting in the capillary reservoir 65 to which oil also is stored secondarily within the passage 59 between the gear 53 and the forward bearing 39. The oil thus collected when the shaft 30 is at rest at the forward provides a ready supply for the bearing rollers with each start of rotation.

Functioning in a like manner as described above is a second sleeve 66 which is loosely telescoped onto the shaft 30 and extends between the rear bearing 36 and the reduction gear 53 to provide oil to the rear bearing. Additional shorter sleeves 67 (see FIG. 1) are positioned on other shafts in the gear train, extending between other bearing units and gears 69 mating with partially emersed transfer gears 56 to provide lubricating oil throughout the gear train.

It has been found that upon inspection of the exemplary gear train 26 that even with a short period of intermittent and slow speed operation of the meter 10, the front and rear bearing units 39 and 36 become flooded with oil in comparison to operation of the meter without using the sleeves 57, 66 and 67. Thus, it will be appreciated that the present lubrication system utilizing the loosely fitting sleeves for forming the lubricating passages 59 along the rotating shafts 30 of the gear train 26 brings to the art a particularly simple yet highly effective arrangement for lubrication of the gears and bearings of the gear train.

I claim

1. In a gas meter having a housing containing a lubricant reservoir for lubrication of a gear train in a meter counter assembly with at least one of the gears in the gear train partially immersed in the lubricant in the reservoir for transmitting lubricant to other gears in the train and a rotatable shaft upon which a first of the gears in the train is mounted, said shaft including a first end portion rotatably received within a first bearing located within the housing distant from said first rear, the improvement comprising a tubular sleeve rotationally loosely telescoped onto said shaft between said first gear and said first bearing and defining a lubricant carrying passage between said shaft and the inside of said sleeve, said passage serving to transmit lubricant from adjacent said first gear to said first bearing for the lubrication of said first bearing.

2. In a gas meter having a housing containing a lubricant reservoir for lubrication of a gear train in a meter counter assembly with the gear train having at least one of the gears therein partially immersed in the lubricant in the reservoir for transmitting lubricant to other gears in the train and a rotatable shaft upon which a first of the gears in the train is mounted, said shaft including a first portion rotatably received within a first bearing located within the housing distant from said first gear, the improvement comprising a tubular capillary passage loosely carried on said shaft and extending between said gear and said first bearing, said passage having a one end thereof opening adjacent said first gear and an opposite end opening adjacent said first bearing so that lubricant collecting adjacent said gear may be transmitted to said first bearing for the lubrication of said first bearing.

3. A gas meter as defined by claim 2 wherein said improvement further comprises a tubular sleeve loosely mounted on said rotatable shaft for rotational movement relative thereto and extending between said first gear and said first rearing, said sleeve having an inside wall surface with at least a portion thereof spaced from the outside of said rotatable shaft, said capillary passage being defined by the space between said inside wall surface and the outside of said rotatable shaft.

4. A gas meter as defined by claim 3 including a second bearing located within the housing and rotatably supporting a portion of said rotatable shaft, said second bearing being spaced from said first gear in a direction opposite from said first bearing, wherein said improvement further comprises a second tubular sleeve loosely mounted on said rotatable shaft and extending between said first gear and said second bearing, a second capillary passage defined by the space between the inside wall of said second sleeve and the outside of said rotatable shaft so that lubricant collecting adjacent said first gear may be transmitted to said second bearing for the lubrication of said second bearing.

5. In a gas meter having a housing containing a lubricant reservoir for lubrication of a gear train including a rotatable shaft with a first of the gears in the train mounted between opposite end portions of the shaft, said opposite end portions being supported within bearing assemblies mounted within the housing and lubricated by lubricant from the reservoir, the improvement comprising a tubular passage loosely carried on said shaft and extending between said first gear and one of said bearing assemblies, said passage having a one end thereof opening adjacent said first gear and an opposite end opening adjacent said one bearing assembly so that lubricant collecting adjacent said first gear may be transmitted to said first bearing through said passage for the lubrication of said first bearing.

6. In a gas meter having a housing containing a lubricant reservoir, a rotatable shaft supported within said housing and spaced from said reservoir, said shaft including first and second portions thereof spaced from each other, apparatus within said housing for transferring lubricant from said reservoir to said first portion of said shaft, the improvement comprising a tubular sleeve telescoped rotationally loosely onto said shaft and extending between said first and second portions, and a lubricant carrying passage defined by the space between the outside of said shaft and the inside of said sleeve, said passage serving to transmit lubricant from said first portion of said shaft to said second portion of said shaft.

* * * * *

UNITED STATES PATENT AND TRADEMARK OFFICE
CERTIFICATE OF CORRECTION

PATENT NO. :   5,105,911
DATED      :   April 21, 1992
INVENTOR(S) :  Albert B. Atkinson It is certified that error appears in the above-identified patent and that said Letters Patent is hereby corrected as shown below:

Claim 1, column 4, line 49, change "rear" to --gear--.

Claim 1, column 4, line 50, change "rotationally" to --telescoped--.

Claim 1, column 4, line 51, change "loosely telescoped" to --rotationally loosely--.

Claim 3, column 5, line 10, change "rearing" to --bearing--.

Signed and Sealed this

Twenty-second Day of June, 1993

Attest:

MICHAEL K. KIRK

*Attesting Officer*     *Acting Commissioner of Patents and Trademarks*